Oct. 31, 1961  D. E. LLEWELLYN  3,006,001
CAMPER KIT FOR SMALL CARS
Filed Feb. 16, 1960  3 Sheets-Sheet 1
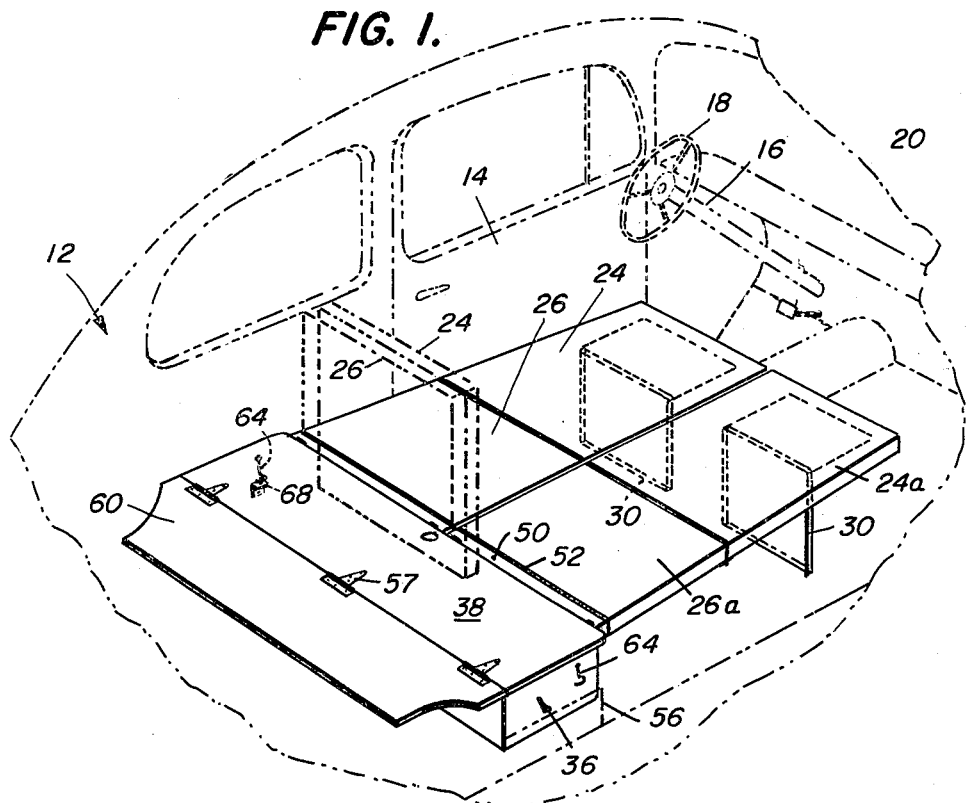
INVENTOR
DON E. LLEWELLYN
BY
ATTORNEY

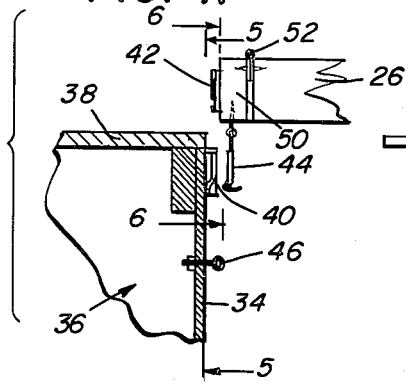
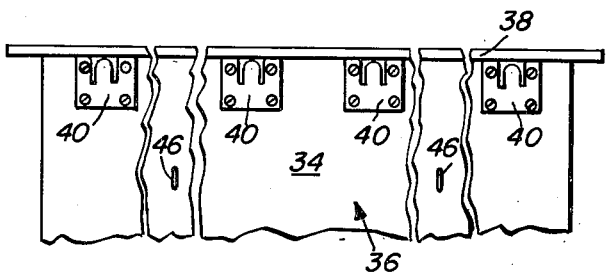
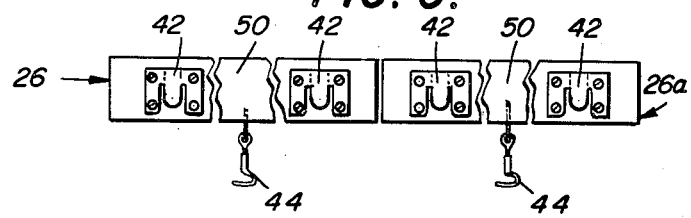
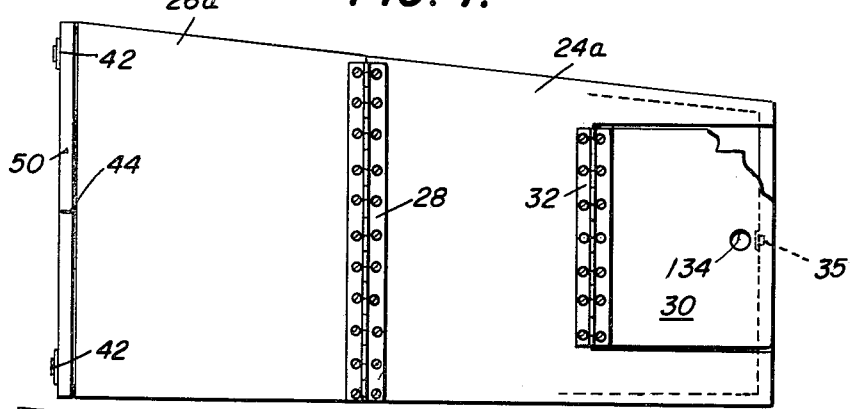
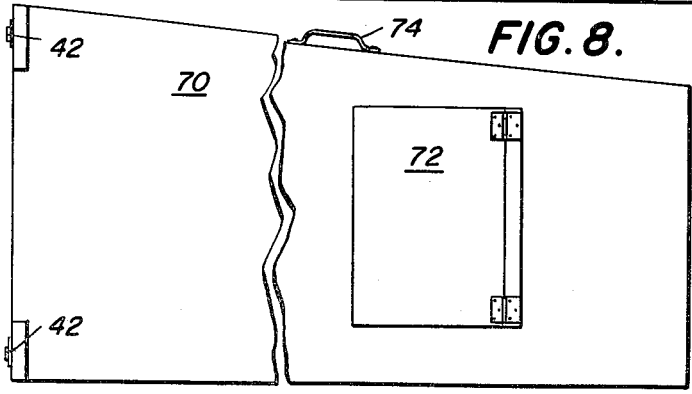

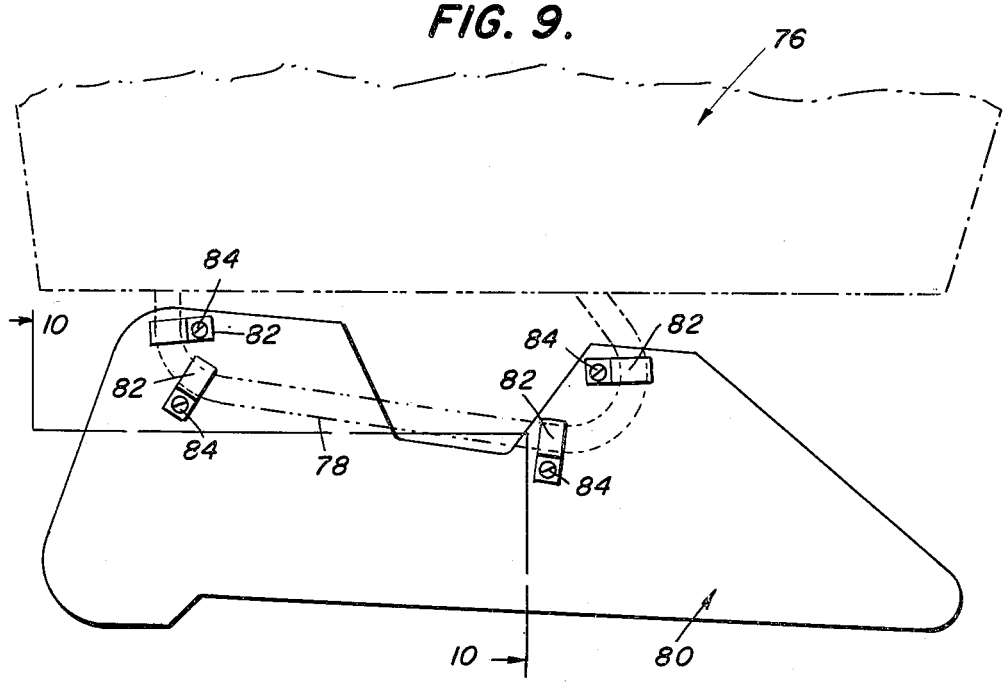
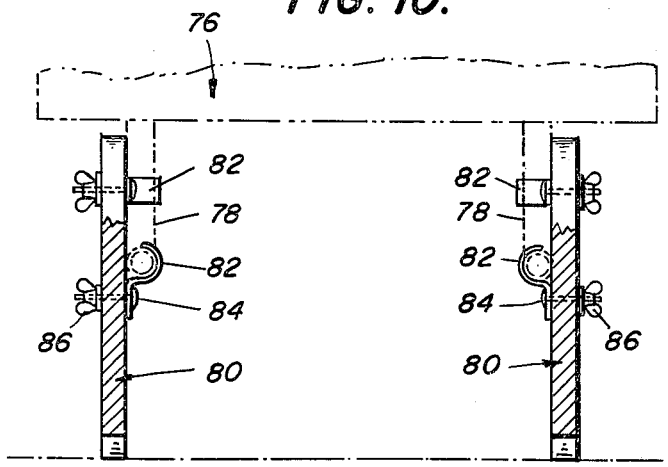

333
United States Patent Office 3,006,001
Patented Oct. 31, 1961

3,006,001
CAMPER KIT FOR SMALL CARS
Don E. Llewellyn, 1531 N. Keystone Ave.,
Burbank, Calif.
Filed Feb. 16, 1960, Ser. No. 9,001
1 Claim. (Cl. 5—118)

This invention relates to a camper kit for small cars and has for one of its principal objects the provision of a device of the class described whereby, with a few relatively minor changes and the introduction of some relatively simple extra material, any small car, either foreign or domestic, can be conveniently and readily converted so as to provide ample sleeping accommodations for one or two people and perhaps even an extra person, namely a child.

Another object of the invention is to provide, in a camper kit for small cars, an appurtenance which, when affixed to one of the seats, will provide a comfortable chair for use externally of the car.

Another object of the invention relates to the provision of sleeping or seating equipment for either one or two persons, as desired or convenient, and as employed in connection with the utilization of what is known as a small or compact automobile.

Another and still further important object of the invention is to provide a camper kit which can be employed with automobiles of any type and size with possibly a few modifications and changes in detail and which will permit a convenient and ready transformation of the automobile from a vehicle to comfortable and secure sleeping quarters.

Yet another and still further important object of the invention is to provide a camper kit, as above described, which will be relatively inexpensive, composed of a minimum number of parts and readily installed and removed when desired or necessary and without the use of any special tools.

In the drawings:

FIGURE 1 is a somewhat diagrammatic and relatively restricted perspective view of a representative portion of a small or compact automobile and showing the improved camper kit of this invention applied thereto and installed therein.

FIGURE 2 is a longitudinal section of a portion of the structure shown in FIGURE 1.

FIGURE 3 is a detail view, partly in section, taken on the plane of the line 3—3 of FIGURE 2, looking in the direction indicated by the arrows.

FIGURE 4 is a further detail, partly in section and parts broken away, illustrating the equipment and also the method of connecting certain portions of the kit of this invention to other parts of the automobile.

FIGURE 5 is a fore-shortened end elevation, parts being broken away, taken on the plane of the line 5—5 of FIGURE 4, looking in the direction indicated.

FIGURE 6 is a view, parts being broken away, on the line 6—6 of FIGURE 4.

FIGURE 7 is a bottom plan view of an extension unit which forms one of the beds when installed in the car.

FIGURE 8 is a view somewhat similar to FIGURE 7, but illustrating a slightly modified form of that portion of the invention.

FIGURE 9 is an elevation, parts being broken away, illustrating the adapting means whereby one of the seats of the automobile can be conveniently converted to a chair for use outside of the car.

FIGURE 10 is a view taken on the broken line 10—10 of FIGURE 9, illustrating certain details of the construction shown in FIGURE 9.

As shown in the drawings:

The reference numeral 12 indicates generally the body of a typical or representative automobile and, in this case, such refers more particularly to one of the smaller types of such vehicles, either domestic or foreign, wherein space is at quite a premium at all times. This particular type of vehicle has side doors, as shown at 14, a steering column and wheel 16 and 18, respectively, a windshield 20 and floor-board 22.

In one particular model of such small cars, the front and rear seats are readily removed as integral individual units and without the employment of any tools, except possibly a pair of pliers to loosen the winged-nuts. The interior of the car is shown with the seats removed and equipped with the construction of this invention, whereby a suitable bed for at least two people is constructed.

As best shown in FIGURES 1 and 2, each of the bed portions comprises a platform or the like indicated by the reference numerals 24 and 26, and also the reference numerals 24a and 26a, respectively. These two portions are connected by hinges 28 (FIGURES 2 and 7), which hinges are on the underface of the connected portions and enable them to be readily folded up against each other, as shown in the dotted lines of FIGURE 1. In this manner, both front seats may be placed in the car without necessitating the complete removal of the bed-forming portions.

It will be noted that the extension 24 is provided with a forward recess into which a support 30 fits, this being hinged to the underface of the portion 24 at 32 (FIGURE 7). A hand-hole 134 is provided in the support 30, along with the friction catch 35, whereby the same may be readily manipulated from a folded position, as shown in the dotted lines in FIGURE 2, to the full lines in that figure. In the full line position, the bed extension 24—26 is completely and adequately maintained in desired relationship for an occupant.

The other end of the support 24—26 is adapted to be interfitted with one wall 34 of the storage compartment 36 of the automobile. This storage compartment is provided with a hinged lid 38 (FIGURE 2) and, as best shown in FIGURES 4, 5 and 6, a series of flush-mount hangers 40 is fastened to the upper edge of the front portion 34 of the storage compartment 36. These comprise the female half of the units with a corresponding number of male portions 42 (FIGURE 6), adapted to interfit therewith in juxtaposed position, as best shown in FIGURE 4. When these parts are interfitted, hooks 44 are passed through eyelets 46, making a secure connection.

Referring again to FIGURE 4 and also to FIGURE 2, it will be noted that the hooks 44 are mounted in a cross piece or strip 50 which extends across the end of the element 26 and is hinged thereto by a piano-hinge structure or the like 52. This enables the upward movement of the joined sections 24 and 26 into a retracted or non-use position, as shown in the dotted lines in FIGURES 1 and 2. When this is done, another hook 54, which ordinarily depends from the forward end of the section 24, is employed to maintain these parts in their folded position (FIGURE 2).

It will be noted that the storage compartment is mounted on the conventional seat-retaining structure 56 which is never removed from the car at any time, but which does removably support the rear seats when the vehicle is employed for transportation purposes.

It will further be noted that the strap hinges 57 for the storage compartment cover are fastened to a platform 60 which forms a head rest when the device is employed as a bed, and the rear end of this platform 60 rests upon a ledge or other support 62, which can be placed in the car at a desired or suitable height.

Referring now to FIGURE 3, it will be noted that the storage compartment 36 is securely held in position in the body of the automobile by means of hooks 64, swingably mounted in adjustable screw eyes 66 positioned in brackets 68 on the inside wall of the car.

A slightly modified form of the invention is illustrated in FIGURE 8, whereby a one-piece element 70 is provided, which can be made of plywood or from other suitable material the same as the other parts. This can be interfitted with the female supports 40 on the storage compartment 36 in the same manner as previously described, and is also provided with a hinged supporting plate 72 similar to the element 30 previously described. In this case, a handle 74 is provided, whereby this particular bed portion can be readily transported from place to place or put into position. There may be two of these, the same as the right- and left-hand bed portions 24 and 26.

The front seats of many of these types of automobiles can be readily removed by loosening a relatively small number of clamps, and one of such seats is indicated by the reference numeral 76 in FIGURE 9. This is provided with tubular U-shaped supports 78 which ordinarily interfit with retaining element (not shown) on the floor of the car.

After such a seat has been removed from the car, the tubular portion 78 can be interfitted with supports 80, as best shown in FIGURE 10, and firmly locked in position by means of conduit clips or the like 82 which, in turn, are retained in operative relationship by suitable bolts 84 and cooperating winged-nuts 86. In this manner, comfortable chairs for use outside of the car are readily made available.

It will be evident that herein is provided a camper kit, which, with some more or less simple modifications or changes, can be made for use with almost any type of automobile and more particularly those of the smaller cars, whereby the seats can be readily removed. It has been found that ample sleeping room is hereby provided for two persons, even tall and heavy ones and on occasion a small child may also be accommodated. In fact, with both of the bed portions 24 and 26 folded into the upright portion shown in the dotted lines in FIGURES 1 and 2, ample sleeping space is provided across the back of the car for a fairly large child or even a small adult. Such a person in that space could, of course, be actually sleeping while the car is in motion.

Any suitable material may be employed, such as plywood or even light metal, and various connecting means other than those shown and described are available, and the dimensions and shapes can obviously be altered so as to interfit with cars of various sizes and models.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

A camper kit for automobiles comprising a pair of bed platforms, means for installing the platforms in lieu of the ordinary vehicle seats, each platform comprising a plurality of portions hinged together, a hinged supporting strut for at least one portion of each platform, means for connecting one end of each platform to an adjacent part of the automobile, such adjacent part comprising a storage compartment, said storage compartment installed in lieu of the rear seat of the automobile and including a hinged cover, an extension of the cover, said extension providing a head rest for the juxtaposed bed portions, adjustable retaining means for fastening the storage compartment in the automobile body, the bed platforms, when folded and raised while still connected to the storage compartment, providing an optional sleeping space, each platform being recessed to receive the support hinged to its underface and a hook comprising connecting means mounted on the edge of the unit to maintain the folded unit in desired position behind the front seat of the automobile.

References Cited in the file of this patent

UNITED STATES PATENTS

| | | |
|---|---|---|
| 1,577,232 | Holly | Mar. 16, 1926 |
| 1,832,767 | Dameron | Nov. 17, 1931 |
| 2,353,331 | Hall | July 11, 1944 |
| 2,616,098 | Love | Nov. 4, 1952 |
| 2,641,773 | Kramer | June 16, 1953 |
| 2,711,545 | Moore | June 28, 1955 |

FOREIGN PATENTS

| | | |
|---|---|---|
| 1,088,811 | France | Sept. 15, 1954 |